US007702081B1

(12) United States Patent
Klesper et al.

(10) Patent No.: US 7,702,081 B1
(45) Date of Patent: Apr. 20, 2010

(54) CALL BACK NUMBER PROVISIONING FOR EMERGENCY CALL SERVICES

(75) Inventors: Stevan Klesper, Gardner, KS (US); Stephen Williams, Olathe, KS (US); Kevin McGinnis, Overland Park, KS (US); Arun Santharam, Overland Park, KS (US); Dan Durig, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1093 days.

(21) Appl. No.: 11/358,273

(22) Filed: Feb. 21, 2006

(51) Int. Cl.
*H04M 11/04* (2006.01)

(52) U.S. Cl. ..................................... 379/45; 455/404.1

(58) Field of Classification Search .................. 379/45; 455/404.1
See application file for complete search history.

(56) References Cited

U.S. PATENT DOCUMENTS

| | | | | |
|---|---|---|---|---|
| 7,260,186 | B2 * | 8/2007 | Zhu et al. | 379/45 |
| 2007/0190968 | A1 * | 8/2007 | Dickinson et al. | 455/404.1 |

* cited by examiner

*Primary Examiner*—Curtis Kuntz
*Assistant Examiner*—Maria El-Zoobi

(57) ABSTRACT

An emergency information system comprises an interface and a processing system. The interface is configured to receive first call signaling for an emergency call from a call processing system wherein the first call signaling indicates a call back number. The processing system is configured to process the first call signaling to determine a destination for the emergency call, generate second call signaling indicating a key and the destination, and generate a database message indicating the key and the call back number. The interface is further configured to transfer the second call signaling to the call processing system and transfer the database message to a database system.

20 Claims, 7 Drawing Sheets

CALL BACK NUMBER PROVISIONING FOR EMERGENCY CALL SERVICES

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The field of the invention relates to telecommunication technologies, and in particular, to the provisioning and delivery of emergency call services in telecommunication networks.

2. Description of the Prior Art

Emergency call services, such as 911, are a vital component of most telecommunication services. The provisioning and delivery of emergency services requires a complex interaction between services providers, such as telecommunication carriers, and public safety elements. One important aspect of providing emergency call services is the ability for an emergency responder to call back a caller in the event of a disconnection. However, recent advances in telecommunication technologies have reduced the ability for emergency responders to call back callers.

In the prior art, most users placed emergency calls over the public switched telephone network (PSTN). In the PSTN, a caller can be identified by the physical line over which the emergency call is placed. Even in a case where the line involved includes a caller identification block, the line remains identifiable by the originating switch. The phone number associated with the line can be passed on to the emergency service responder at the appropriate public safety answering point (PSAP). In the event of a service disconnect, the emergency responder can out dial the phone number to reconnect with the caller.

One new telecommunication technology is Voice over Internet Protocol (VoIP). In the case of VoIP, end users have a wide variety of service options, including the ability to block network elements from passing on their call back number to other network elements. In addition, end users are able to provide call back numbers that, when dialed, do not reach back to the user. Unfortunately, the call back number of a VoIP caller cannot be identified by a phone line, as opposed to in the PSTN. As a result, emergency responders are often times unable to call back VoIP-callers in the event of call disconnects.

FIG. 1 illustrates a communication network 100 in an example of the prior art for providing call back numbers to emergency responders for VoIP callers. Communication network 100 includes VoIP network 110, session initiation protocol (SIP) proxy 105, SIP phone 101, emergency information system (EIS) 115, automatic location identification (ALI) database 116, PSTN 120, and PSAP 125.

In this example, a user using SIP phone 101 places an emergency phone call, such as by dialing 911. Typically, SIP proxy 105 communicates with EIS 115 to determine an appropriate PSAP for the call. EIS 115 selects the PSAP and provides the PSAP information to SIP proxy 105. EIS 115 also determines service information for the call, such as the location of and call back number for SIP phone 101. EIS 115 provides the service information to ALI database 116, along with a key. ALI database stores the service information in association with the key. EIS 115 also provides the key to SIP proxy 105.

SIP proxy 105 then communicates with elements of VoIP network 110, such as a media gateway controller, to setup a call leg from SIP phone 101 to PSTN 120. The media gateway controller communicates with elements of PSTN 120, such as a selective router, to establish a call leg through PSTN 120 to PSAP 125. Included in the call setup process, the key is communicated from SIP proxy 105 to PSAP 125 in the form of an ESRK, ESRN, or ESQK. PSAP 125 queries ALI database 116 with the key to obtain the service information stored by ALI database 116 in association with the key. In this manner, operators at PSAP 120 are able to call back the user in the event of a service disconnection.

FIG. 2 illustrates a flow diagram in an example of the prior art to more clearly describe how a call back number is provided to a PSAP. To begin, SIP phone 101 transmits call signaling, such as a SIP invite message, to SIP proxy 105. The SIP invite message includes several information fields. One of the fields is a from field that indicates the sender of the message. The from field is typically populated with a user identification, such as a SIP user ID. SIP user IDs are often times in the form of userID@network.com. Another field is the called number field. In this case, the called number field indicates 911.

In response to the first invite message, SIP proxy 105 transmits another SIP invite to EIS 115. The second SIP invite also includes the user ID in the from field. EIS 115 performs a database lookup to a database system to determine a call back number based on the user ID. The database system typically contains user IDs stored in association with 10 digit telephone numbers.

Upon determining the call back number, EIS 115 transfers the key and call back number to ALI database 120. ALI database 120 stores the call back number in association with the key. EIS 115 also transfers call signaling to SIP proxy 105 indicating the appropriate PSAP and the key. SIP proxy 105 proceeds to setup the emergency call between SIP phone 101 and PSAP 120. During the call setup process, the key is passed to PSAP 120. PSAP 120 queries ALI database 120 with the key to determine the call back number for the call.

Eventually, call communications commence between an operator at PSAP 120 and the user at SIP phone 101. In the event of an on-hook event or some other service disruption, the operator can call back the user using the provided call back number. Call communications can be re-established and emergency service can continue.

As illustrated in FIG. 2, the prior art contains significant drawbacks in the provisioning and delivery of emergency call services. For example, EIS 115 is required to perform a database look-up based on a user ID in order to determine a call back number for the emergency call, costing valuable time and resources. In addition, storing and maintaining call back numbers at EIS 115 is costly and error prone. Further problematically, users are able to hack into the various fields of SIP invite messages. This reduces the reliability of user IDs provided from SIP phones and further impacts the ability of emergency responders to call back VoIP callers in the event of service disruptions.

SUMMARY OF THE INVENTION

An embodiment of the invention helps solve the above problems and other problems by providing systems, methods, and software for providing a call back number from a call processing system directly to an emergency information system, rather than requiring the emergency information system to perform a resource intensive database look-up based on a user identification. In addition, the call back number is provided to the emergency information system in a secure manner, rather than relying upon user-accessible data fields.

In an embodiment of the invention, an emergency information system comprises an interface and a processing system. The interface is configured to receive first call signaling for an emergency call from a call processing system wherein the first call signaling indicates a call back number. The processing system is configured to process the first call signaling to determine a destination for the emergency call, generate second call signaling indicating a key and the destination, and generate a database message indicating the key and the call back number. The interface is further configured to transfer the second call signaling to the call processing system and transfer the database message to a database system.

In an embodiment of the invention, the emergency information system is configured to determine the call back number from the first call signaling.

In an embodiment of the invention, the first call signaling comprises a session initiation protocol (SIP) invite message.

In an embodiment of the invention, the call processing system is configured to insert the call back number into a privacy asserted identity field of the SIP invite message.

In an embodiment of the invention, the processing system is configured to process the privacy asserted identity field to determine the call back number.

In an embodiment of the invention, the call processing system transfers the key to the destination and wherein the destination transfers a query indicating the key to the database system and wherein the database system returns a response indicating the call back number in response to the query.

In an embodiment of the invention, the database system comprises an automatic location identification (ALI) database system.

In an embodiment of the invention, the destination comprises a public safety answering point (PSAP).

BRIEF DESCRIPTION OF THE DRAWINGS

The same reference number represents the same element on all drawings.

DETAILED DESCRIPTION OF THE PREFERRED EMBODIMENT

FIGS. 3-7 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

Figure 1:
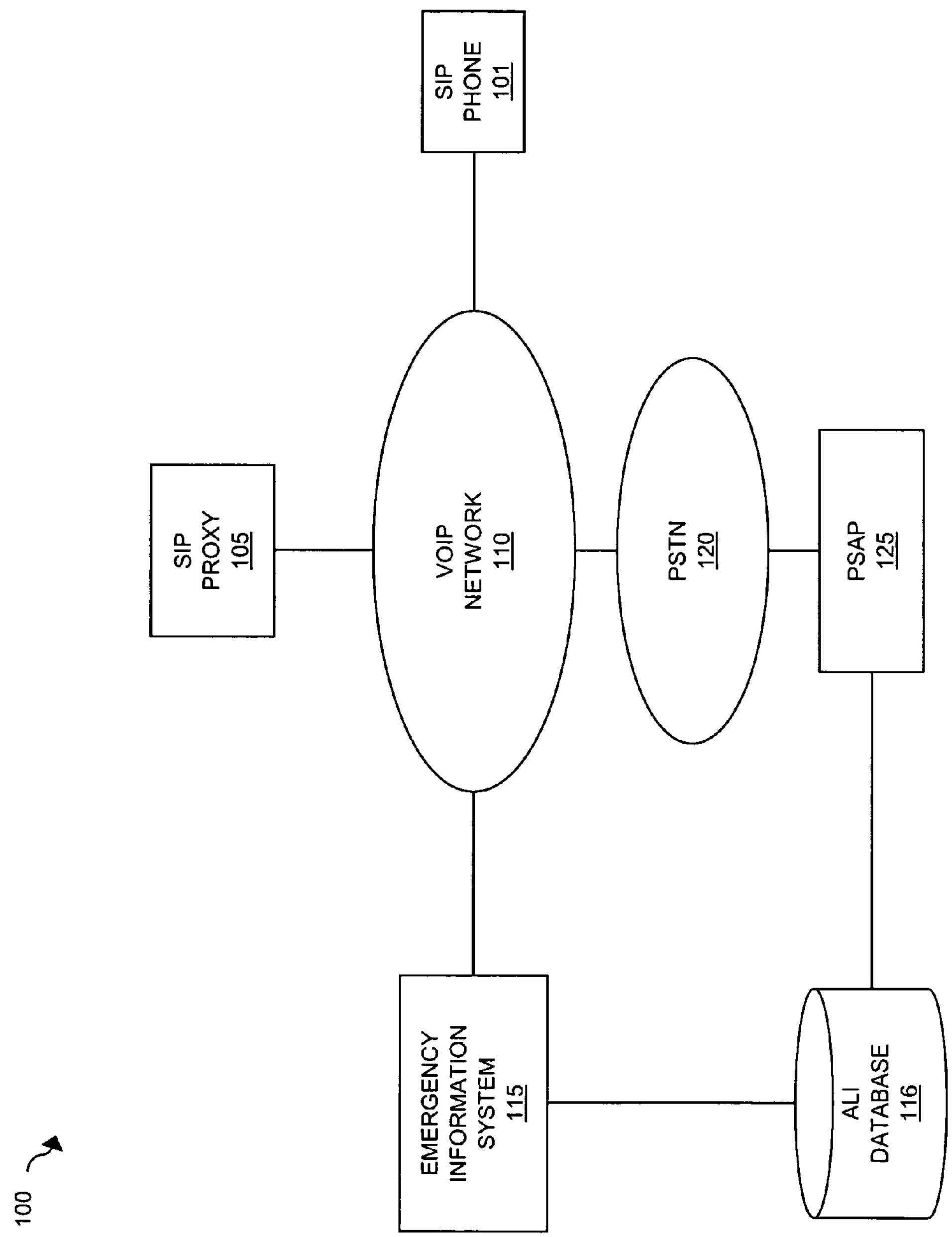
FIG. 1 illustrates a communication network in an example of the prior art.
Figure 2:
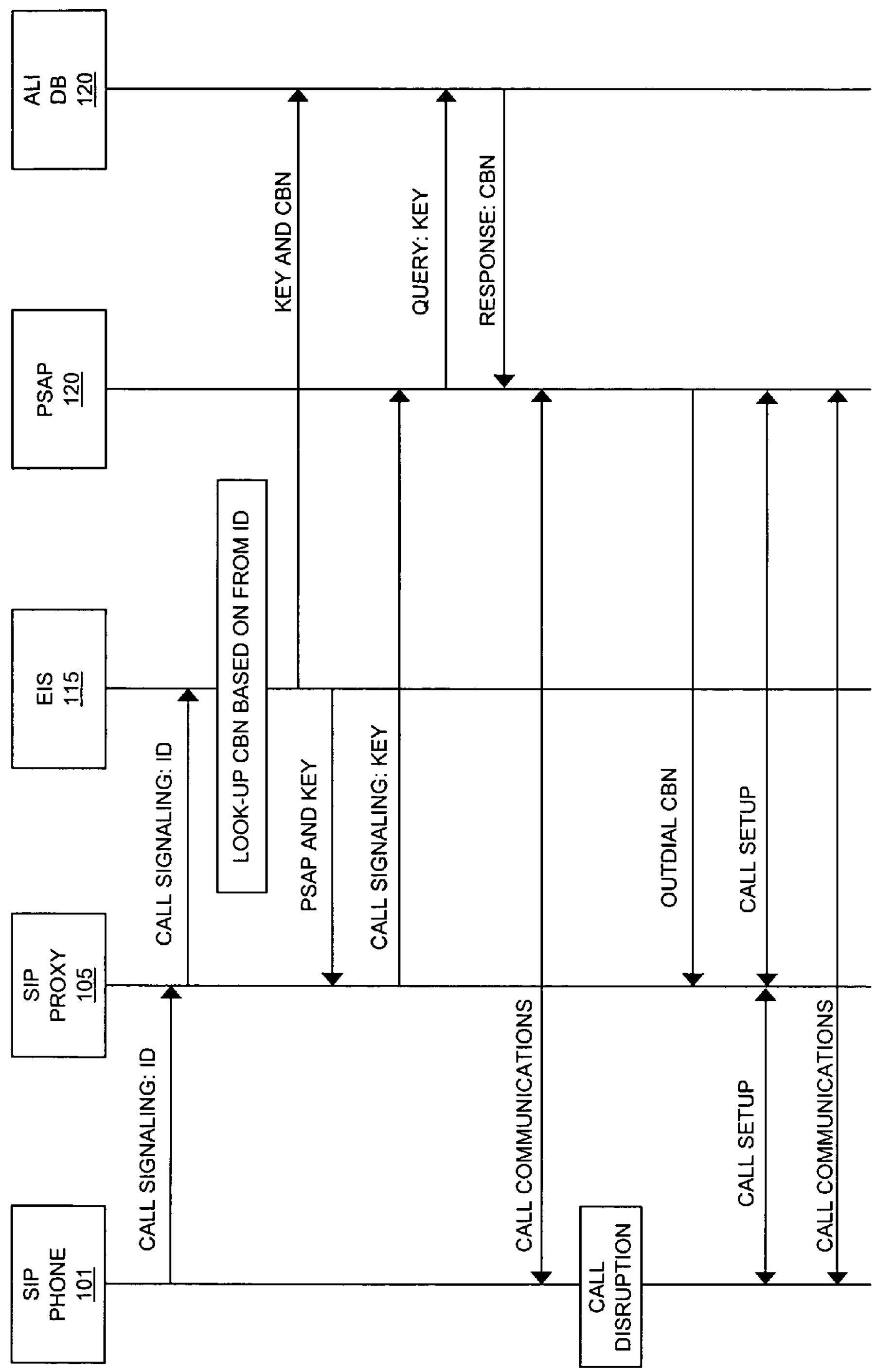
FIG. 2 illustrates the operation of a communication network in an example of the prior art.
Figure 3:
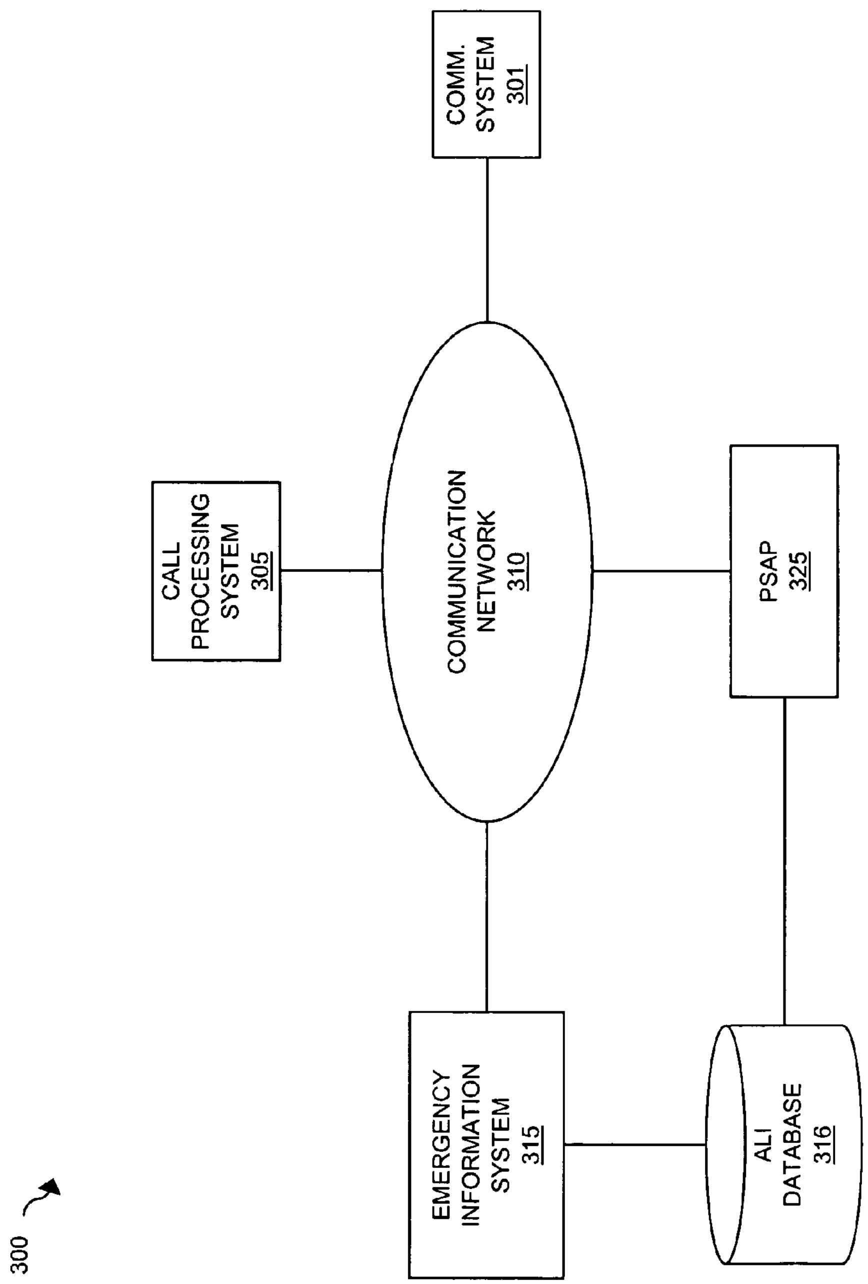
FIG. 3 illustrates a communication system in an embodiment of the invention.
Figure 4:
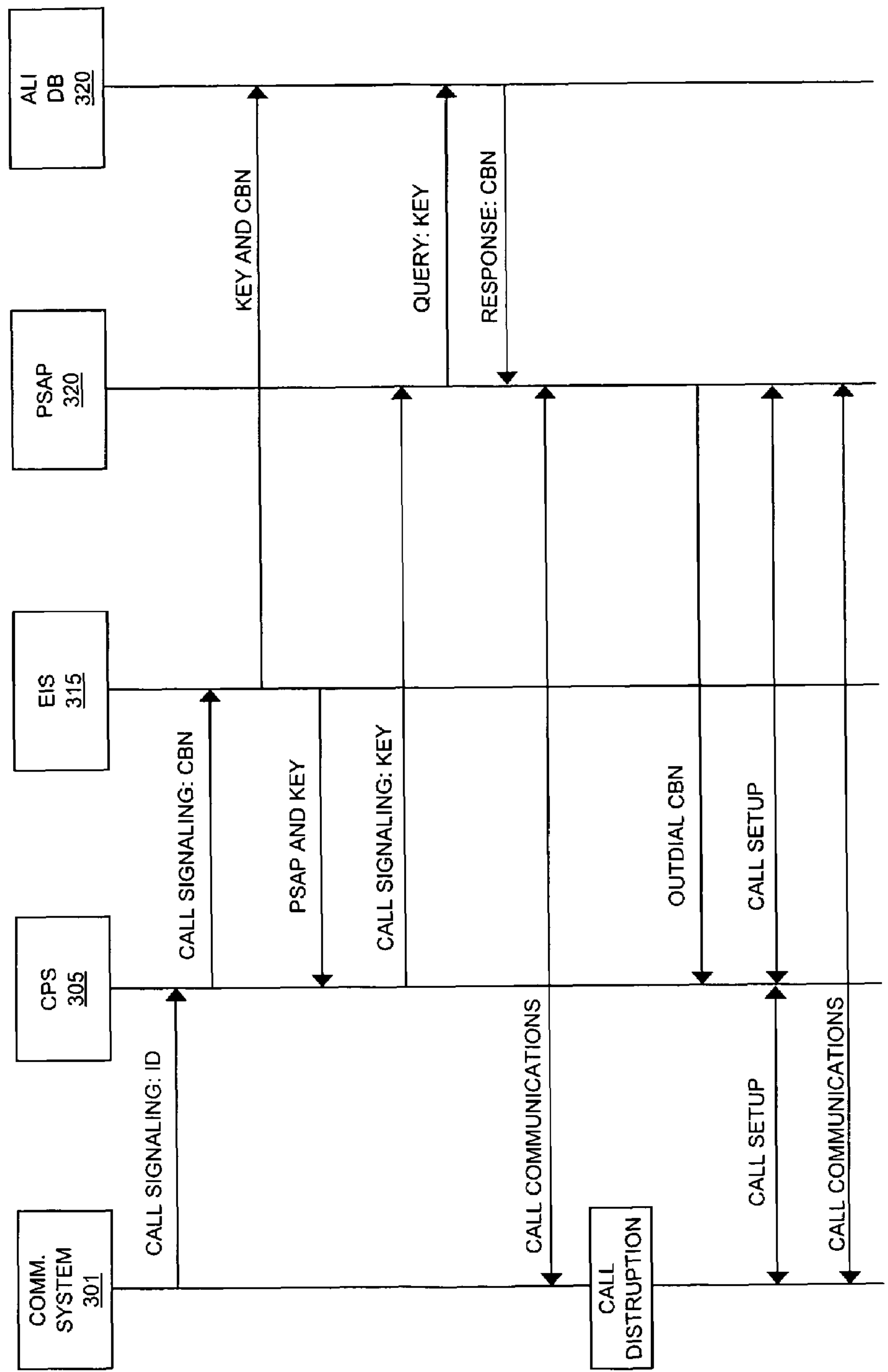
FIG. 4 illustrates the operation of a communication system in an embodiment of the invention.

FIGS. 3 and 4

FIG. 3 illustrates communication system 300 in an embodiment of the invention. In this embodiment, a call back number is passed from a call processing system directly to an emergency information system (EIS), rather than requiring the EIS to perform a resource intensive database look-up based on a user identification. In addition, the call back number is provided to the EIS in a secure manner, rather than relying upon user-accessible data fields.

Communication system 300 includes communication network 310, communication system 301, call processing system (CPS) 305, PSAP 325, EIS 15, and ALI database 316. Communication network 310 could be any network or collection of networks capable of operatively transporting communications between CPS 305, EIS 315, communication system 301, and PSAP 325. Communications could comprise signaling as well as bearer traffic.

CPS 305 could be any system capable of communicating with EIS 315, communication system 301, and communication network 310. Communication system 301 could be any system capable of communicating with CPS 305 and communication network 310. Communication system 301 could be a communication device, as well as a collection of multiple communication devices, such as a phone device and an access device. PSAP 325 could comprise any PSAP capable of communicating with ALI database 316 and communication network 316. EIS 315 could be any system capable of communicating with CPS 305, ALI database 316, and communication network 310.

FIG. 4 is a flow diagram illustrating the operation of communication network 300 in an embodiment of the invention. In this embodiment, the provisioning and delivery of a call back number is illustrated.

To begin, communication system 301 transmits call signaling to CPS 305 for an emergency call. The call signaling indicates that the call is an emergency call. The call signaling also includes a user identification. CPS 305 receives the call signaling from communication system 301 and processes the call signaling to determine a call back number for the call. CPS 305 transmits new call signaling to EIS 315 indicating the call back number. The new call signaling could also include the user identification, as well as other information.

EIS 315 processes the call signaling to determine a key for the call and to select a PSAP for the call. In this case, the selected PSAP is PSAP 320. EIS 315 transfers a database message to ALI database 320 indicating the key and the call back number. EIS 315 also generates new call signaling indicating the PSAP and the key, and transfers the new call signaling to CPS 305.

CPS 305 processes the new call signaling to setup the call over communication network 310 between communication system 301 and PSAP 320. In the course of call setup, the key is transferred from CPS 305 to PSAP 320. PSAP 320 transfers a query to ALI database 320 indicating the key. ALI database 320 processes the query to determine the call back number stored in association with the key. ALI database 320 returns a response to PSAP 320 indicating the call back number. Eventually, the emergency call commences between PSAP 320 and communication system 301. At anytime, a service disruption could occur. In the event of a service disruption, PSAP 320 can place a call to communication system 301 utilizing the call back number and the call can be re-established.

As illustrated, communication system 300 provides for securely and reliably providing a PSAP with a call back number for an emergency call. In particular, CPS 305 determines the call back number and provides the call back number to EIS 315, rather than requiring EIS to perform a database look-up to determine the call back number. In addition, CPS 305 determines the call back number without relying upon user-accessible data fields. In this manner, processing resources of EIS 315 are conserved and call back numbers are protected from user interference.

Second Embodiment Configuration and Operation

Figure 5:
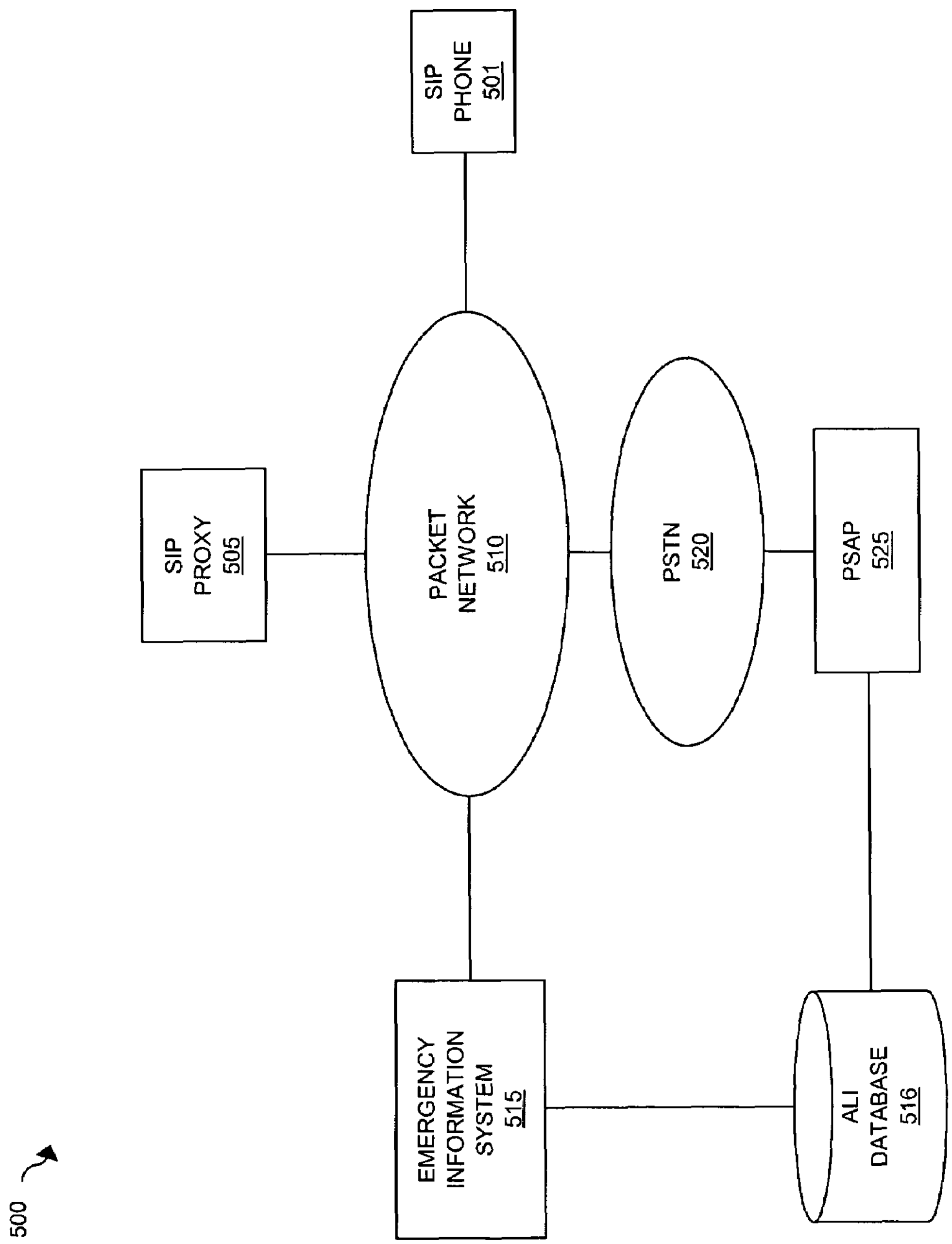
FIG. 5 illustrates a communication system in an embodiment of the invention.
Figure 6:
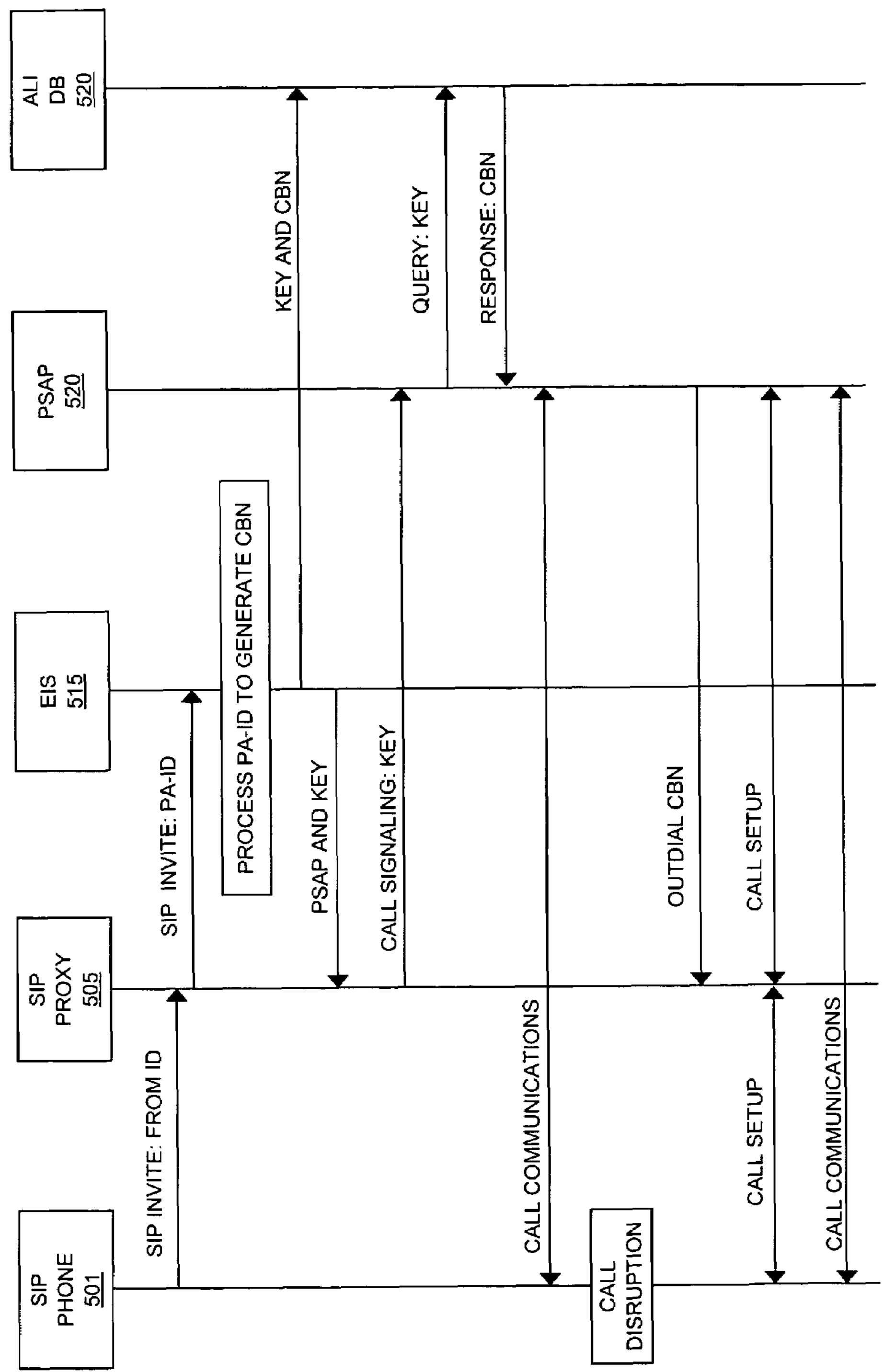
FIG. 6 illustrates the operation of a communication system in an embodiment of the invention.

FIGS. 5 and 6

FIG. 5 illustrates communication network 500 in an embodiment of the invention. Communication network 500 includes packet network 510, SIP proxy 505, SIP phone 501, PSTN 520, EIS 515, PSAP 525, and ALI database 516. SIP proxy 505 is operatively coupled to packet network 510. SIP phone 501 is also operatively coupled to packet network 510. EIS 515 is operatively coupled to packet network 510 and ALI database 516. PSTN 520 is operatively coupled to packet network 510 and PSAP 525. Both packet network 510 and PSTN 520 could include elements that are not shown for purposes of clarity. Packet network 510 could be a single packet network or a collection of packet networks.

It should be understood that EIS 515 is depicted as directly connected to ALI database system 516 for illustrative purposes only, and that EIS 515 could be in communication with ALI database system 516 over any type of communication network. Similarly, it should be understood that PSAP 525 is depicted as directly connected to ALI database system 516 for illustrative purposes only, and that PSAP 525 could be in communication with ALI database system 516 over any type of communication network.

FIG. 6 illustrates the operation of communication network 500 in an embodiment of the invention. To begin, it is assumed that a user has registered SIP phone 501 with SIP proxy 505. During the registration process, the user and device are authenticated. SIP proxy 505 typically stores vital information, such as a call back number for the user, at the time of registration. The information could be obtained from the user during the registration process or could be permanently stored at another location and accessed by SIP proxy 505 during the registration process.

Turning to FIG. 6, SIP phone 501 transmits a SIP invite message SIP to proxy 505 for an emergency call. The invite message indicates that the call is an emergency call. The invite message also includes a user identification, such as in the form of userID@sipnetwork.com. SIP proxy 505 receives the invite message from SIP phone 501 and processes the message to determine a call back number for the call. For example, SIP proxy 505 could look-up the call back number based on the user ID included in the invite message or an IP address included in the invite message, as well as by using other information well known to those skilled in the art.

SIP proxy 505 then transmits a new SIP invite message to EIS 515 indicating the call back number. In particular, SIP proxy 505 creates a privacy asserted identity field in the new invite message and populates the privacy asserted identity field with the call back number. The privacy asserted identity field is used among trusted SIP entities (typically intermediaries) to carry the identity of the user sending a SIP message as it was verified by authentication. The call back number could be provided in the form of a telephone uniform resource indicator (TEL-URI) as is commonly understood in the art. For instance, the privacy asserted identity field could read 555-555-5555@sipnetwork.com. The invite message could include additional information.

EIS 515 processes the invite message from SIP proxy 505 to determine a key for the call and to select a PSAP for the call. In this case, the selected PSAP is PSAP 525. The key could be in the form of an ESRK, ESRN, or ESQK as is well understood in the art. Other types of keys are possible. EIS 515 also pulls the 10 digit phone number from the privacy asserted identity field and generates a database message indicating the 10 digit phone number. EIS 515 then transfers the database message to ALI database 520 indicating the key and the 10 digit call back number. EIS 515 also generates another new SIP invite message indicating the PSAP and the key and transfers the new call signaling to SIP proxy 505.

SIP proxy 505 processes the new invite message to setup the call over packet network 510 and PSTN 520 between SIP phone 501 and PSAP 525. In the course of call setup, the key is transferred from SIP proxy 505 to PSAP 525. PSAP 525 transfers a query to ALI database 520 indicating the key. ALI database 520 processes the query to determine the call back number stored in association with the key. ALI database 520 returns a response to PSAP 525 indicating the call back number.

At anytime during the call between PSAP 525 and SIP phone 501, a service disruption could occur. In such a case, PSAP 525 can place a call to communication system 501 utilizing the call back number and the call can be re-established.

The above illustration depicts a scenario whereby PSAP 525 is operatively coupled to PSTN 520. Due to this constraint, EIS 515 typically passes a 10 digit telephone number to ALI database 516. The 10 digit telephone number is derived by EIS 515 from the TEL-URI described in the privacy asserted identity field of the SIP invite message received from SIP proxy 505. It should be understood that PSAP 525 could be a SIP enabled PSAP that is capable of communicating directly over a packet network, rather than traversing the PSTN. In such a case, SIP proxy 505 could fill with privacy asserted identity field with a SIP URI, rather than the TEL URI. Alternatively, SIP proxy 505 could data fill the field with both the TEL URI and the SIP URI. Regardless, EIS 515 could provide the SIP URI to ALI database 516. In turn, PSAP 525 could query ALI database 516 for the SIP URI. PSAP 525 could then connect with SIP phone 501 using the SIP URI, as is well understood in the art.

As illustrated, communication system 500 provides for securely and reliably providing a PSAP with a call back number for an emergency call. In particular, SIP proxy 505 determines the call back number and provides the call back number to EIS 515, rather than requiring EIS 515 to perform a database look-up to determine the call back number. In addition, SIP proxy 505 determines the call back number without relying upon user-accessible data fields. In this manner, processing resources of EIS 515 are conserved and the integrity of call back numbers are protected.

Computer System

Figure 7:
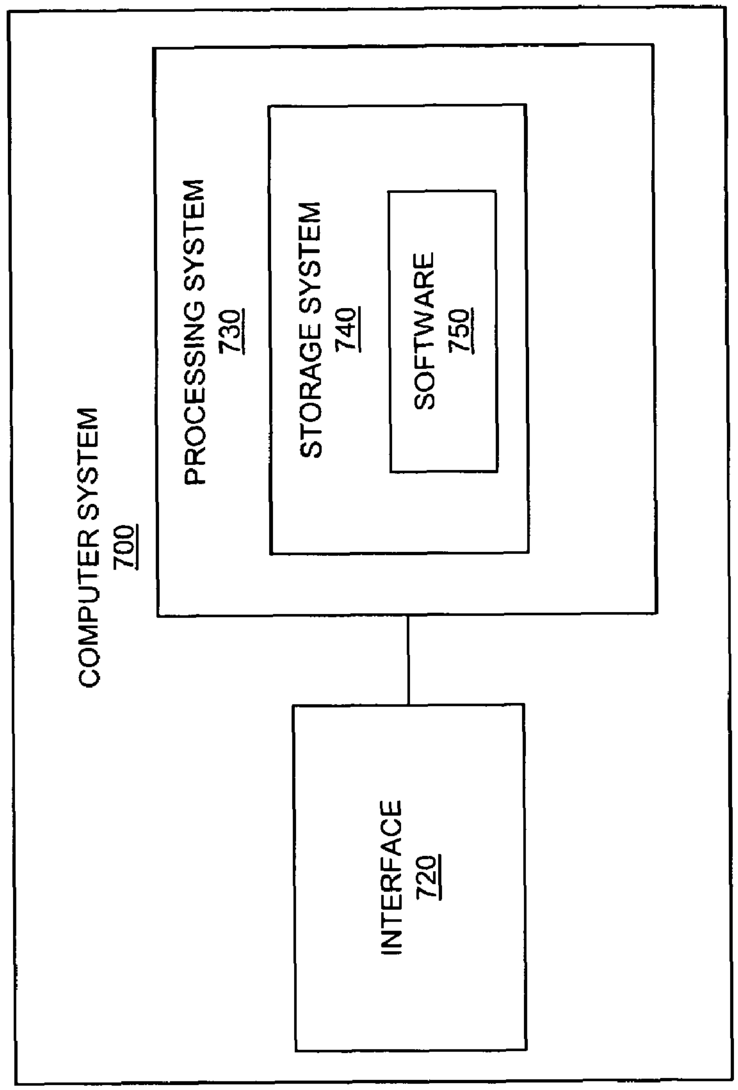
FIG. 7 illustrates a computer system in an embodiment of the invention.

FIG. 7 illustrates computer system 700 in an embodiment of the invention. Computer system 700 includes interface 720, processing system 730, storage system 740, and software 750. Storage system 740 stores software 750. Processing system 730 is linked to interface 720. Computer system 700 could be comprised of a programmed general-purpose computer, although those skilled in the art will appreciate that programmable or special purpose circuitry and equipment may be used. Computer system 700 may use a client server architecture where operations are distributed among a server system and client devices that together comprise elements 720-750.

Interface 720 could comprise a network interface card, modem, port, or some other communication device. Signaling interface 720 may be distributed among multiple communication devices. Processing system 730 could comprise a computer microprocessor, logic circuit, or some other processing device. Processing system 730 may be distributed among multiple processing devices. Storage system 740 could comprise a disk, tape, integrated circuit, server, or some other memory device. Storage system 740 may be distributed among multiple memory devices.

Processing system 730 retrieves and executes software 750 from storage system 740. Software 750 may comprise an operating system, utilities, drivers, networking software, and other software typically loaded onto a general-purpose computer. Software 750 could also comprise an application program, firmware, or some other form of machine-readable processing instructions. When executed by the processing system 730, software 750 directs processing system 730 to operate as described for remote service testing systems 200, 400, and 500. Also when executed by the processing system 730, software 750 directs processing system 730 to operate as described for emergency information system 315 and emergency information system 515.

What is claimed is:

1. A communication system comprising:

a call processing system configured to receive first call signaling for an emergency call indicating a user identification for a caller, process the user identification to determine a call back number for the caller, insert the call back number into the first call signaling, and transfer the first call signaling to an emergency information system;

the emergency information system configured to receive the first call signaling from the call processing system, process the first call signaling to determine a destination for the emergency call, generate second call signaling indicating a key and the destination, generate a database message indicating the key and the call back number, transfer the second call signaling to the call processing system, and transfer the database message to a database system.

2. The communication system of claim 1 wherein the emergency information system is further configured to determine the call back number from the first call signaling.

3. The communication system of claim 2 wherein the first call signaling comprises a session initiation protocol (SIP) invite message.

4. The communication system of claim 3 wherein the call processing system is further configured to insert the call back number into a privacy asserted identity field of the SIP invite message.

5. The communication system of claim 1 wherein the emergency information system is further configured to process a privacy asserted identity field to determine the call back number.

6. The communication system of claim 1 wherein the call processing system is further configured to transfer the key to the destination and wherein the destination is configured to transfer a query indicating the key to the database system and wherein the database system is configured to return a response indicating the call back number in response to the query.

7. The communication system of claim 6 wherein the database system comprises an automatic location identification (ALI) database system.

8. The communication system of claim 7 wherein the destination comprises a public safety answering point (PSAP).

9. A method of operating communication system, the method comprising:

in a call processing system, receiving first call signaling for an emergency call indicating a user identification for a caller, processing the user identification to determine a call back number for the caller, inserting the call back number into the first call signaling, and transferring the first call signaling to an emergency information system;

in the emergency information system, receiving the first call signaling from the call processing system, processing the first call signaling to determine a destination for the emergency call, generating second call signaling indicating a key and the destination, generating a database message indicating the key and the call back number, transferring the second call signaling to the call processing system, and transferring the database message to a database system.

10. The method of claim 9 further comprising, in the emergency information system, determining the call back number from the first call signaling.

11. The method of claim 10 wherein the first call signaling comprises a session initiation protocol (SIP) invite message.

12. The method of claim 11 wherein the SIP invite message includes a privacy asserted identity field and wherein the call back number is inserted into the privacy asserted identity field.

13. The method of claim 9 further comprising, in the emergency information system, processing a privacy asserted identity field to determine the call back number.

14. The method of claim 9 further comprising transferring the key from the call processing system to the destination, transferring a query indicating the key from the destination to the database system, and transferring a response from the database system to the destination in response to the query wherein the response indicates the call back number.

15. The method of claim 14 wherein the database system comprises an automatic location identification (ALI) database system.

16. The method of claim 15 wherein the destination comprises a public safety answering point (PSAP).

17. A computer storage system with machine-readable processing instructions stored thereon for operating an emergency information system, wherein the processing instructions direct the emergency information system to:

receive first call signaling from an interface wherein the interface received the first call signaling from a call processing system, wherein the first call signaling indicates a call back number of a caller, and wherein the call back number is determined in the call processing system based on a user identification for the caller, process the first call signaling to determine a destination for the emergency call, generate second call signaling indicating a key and the destination, generate a database message indicating the key and the call back number, transfer the second call signaling to the interface for transferring to the call processing system, and transfer the database message to the interface for transferring to a database system.

18. The computer storage system of claim 17 further direct the processing system to determine the call back number from the first call signaling.

19. The computer storage system of claim 18 wherein the first call signaling comprises a session initiation protocol (SIP) invite message and wherein the software is operational when executed by the processing system to direct the processing system to insert the call back number into a privacy asserted identity field of the SIP invite message.

20. The computer storage system of claim 19 wherein the processing system is configured to process the privacy asserted identity field to determine the call back number.

* * * * *